(12) United States Patent
Unrath

(10) Patent No.: US 7,956,522 B2
(45) Date of Patent: Jun. 7, 2011

(54) IGNITION ANODE, IN PARTICULAR FOR REIGNITABLE ROCKET COMBUSTION CHAMBERS

(75) Inventor: Dieter Unrath, Schoental (DE)

(73) Assignee: Astrium GmbH, Munich (DE)

(*) Notice: Subject to any disclaimer, the term of this patent is extended or adjusted under 35 U.S.C. 154(b) by 382 days.

(21) Appl. No.: 11/933,835

(22) Filed: Nov. 1, 2007

(65) Prior Publication Data

US 2008/0136304 A1 Jun. 12, 2008

(30) Foreign Application Priority Data

Nov. 2, 2006 (DE) .......................... 10 2006 052 171

(51) Int. Cl.
*H01T 13/20* (2006.01)
(52) U.S. Cl. ..................................... 313/141; 60/39.821
(58) Field of Classification Search .................. 313/141; 60/39.821
See application file for complete search history.

(56) References Cited

U.S. PATENT DOCUMENTS

| | | | |
|---|---|---|---|
| 2,946,912 A | 7/1960 | Owen et al. | |
| 5,563,469 A * | 10/1996 | Takamura et al. | ............ 313/141 |
| 5,821,676 A * | 10/1998 | Atchinson et al. | ............ 313/140 |
| 6,121,720 A | 9/2000 | Rossi | |
| 6,362,562 B1 * | 3/2002 | Rossi | ............ 313/141 |

FOREIGN PATENT DOCUMENTS

| | | |
|---|---|---|
| DE | 1 170 711 | 5/1964 |
| DE | 41 40 834 | 6/1992 |
| DE | 10 2004 032 723 | 2/2006 |

OTHER PUBLICATIONS

DIN ISO 13715, 2000-12, Beuth Verlage GmbH, 10772 Berlin.
German Office Action dated Mar. 29, 2007 conducted in a German Patent Application No. 10 2006 052 171.4-23, and a partial English language translation of the German Office Action is enclosed.

* cited by examiner

*Primary Examiner* — Anne M Hines
*Assistant Examiner* — Jacob Stern
(74) *Attorney, Agent, or Firm* — Greenblum & Bernstein, P.L.C.

(57) ABSTRACT

An ignition anode for an ignition device of a reignitable rocket combustion chamber. The anode includes an ignition anode body having an ignition anode frontal area. The ignition anode frontal area has a plurality of edges.

19 Claims, 5 Drawing Sheets

IGNITION ANODE, IN PARTICULAR FOR REIGNITABLE ROCKET COMBUSTION CHAMBERS

CROSS-REFERENCE TO RELATED APPLICATIONS

The present application claims priority under 35 U.S.C. §119 of German Patent Application No. 10 2006 052 171.4-23, filed on Nov. 2, 2006, the disclosure of which is expressly incorporated by reference herein in its entirety.

BACKGROUND OF THE INVENTION

1. Field of the Invention

The invention relates to an ignition anode for, in particular, reignitable rocket combustion chambers.

2. Discussion of Background Information

A prior art ignition system made by Stork® Product Engineering B.V. is known by the name EGOX/GH2 VINCI EM Igniter. This is an igniter for reignitable rocket combustion chambers, whereby a gaseous hydrogen-oxygen mixture is ignited by means of electric ignition. An igniter 100 of this type is shown diagrammatically (in a longitudinal sectional view) in FIG. 6 of the instant application.

As can be seen in FIG. 6, the igniter 100 has an igniter housing 101 and a spark plug device 102. An igniter injection head 103 is located in the igniter housing 101, which igniter injection head, together with the igniter housing 101, forms an ignition mixing chamber 104. The ignition mixing chamber 104 opens into an ignition flame tube 105, which projects into the combustion chamber of the rocket to be ignited. The spark plug device 102 has a spark plug 106, which is arranged in a spark plug clamping ring 107. The spark plug 106 has a connection end 108 for connection to an ignition voltage source (not shown). An ignition anode 109 is located opposite the connection end 108, which ignition anode, together with the igniter injection head 103, forms an annular clearance 110, and the front side of which faces the ignition mixing chamber 104. A pipe connection 111 for a hydrogen supply and a pipe connection 112 for an oxygen supply are mounted on the igniter housing 101. Furthermore, measuring devices 113 are provided, e.g., in order to measure an ignition mixing chamber wall temperature.

The ignition anode 109 according to the prior art is shown enlarged in FIG. 6a in a partial longitudinal section. The ignition anode 109 has an essentially cylindrical structure 120 with a first free end 121. Opposite the first free end 121 the cylindrical structure 120 merges into a constricted section 122, which first narrows and expands towards an anode head section 123, the anode head section 123 having an enlarged diameter compared to the cylindrical structure 120. The anode head section 123 has a free end 124, which is formed by a flat frontal area 125 and an obtuse-angled chamfer 126. The free end 124 thus has a single annular edge. The flat frontal area 125 and the flat-angled chamfer 126 form an ignition frontal area, which in the assembled state faces into the igniter mixing chamber 104. An outside 127 of the anode head section 123, together with a corresponding bore in the igniter injection head 103, forms the annular clearance 110. From the free end 121 the ignition anode 109 has a blind-hole recess 128 in the cylindrical structure 120, by means of which blind-hole recess 128, the ignition anode 109 is connected to the spark plug 106 with suitable mounting means in an interacting manner.

An igniter of this type for reignitable rocket combustion chambers has proven to be valuable. However, a progressive erosion on the ignition frontal area is observed with a large number of reignition processes of the rocket combustion chamber. Likewise, an increased wear is established as a result of burn-off. Furthermore, when the rocket combustion chamber is switched off, an oxide layer forms on the ignition frontal area, which when the combustion chamber is reignited impairs the build-up of the plasma spark. This results in a possible increased operational risk.

SUMMARY OF THE INVENTION

The invention provides for an ignition anode for reignitable rocket combustion chambers which is less likely to become damaged by erosion on the ignition frontal area. The burn-off of the ignition frontal area with progressive igniter operation is also reduced. Furthermore, a more uniform anode burn-off over the ignition frontal area should be achieved with progressive operating time. Additionally, the chances of safer operation are increased because reignition during flight operation can be ensured because the operational risk of the igniter is minimized.

According to the invention, the so-called build-up of the plasma spark during reignition is considerably facilitated by utilizing an uneven, in particular, a sharply uneven, frontal area design on the ignition anode. In particular, the frontal area design utilizes at least one particularly sharp, burr-free edge. Such an edge can still function even if an oxide layer forms on or is present on the ignition frontal area. The reason for this relates to the fact that a plasma spark breaks down more easily on an edge, in particular, on a sharp, burr-free edge, than on a flat surface. Furthermore, it is considered advantageous to utilize a plurality (i.e., more than one) edges, which are preferably sharp edges. This ensures that the ignition spark consistently breaks down at different places on the ignition anode frontal area, and thus also provides burn-off at different points. The distribution of the points at which the ignition spark breaks down can thereby be such that the spark preferably breaks down on the edge that forms the narrowest spark gap. If an edge is somewhat worn by burn-off, another edge can form the narrowest spark gap and thereby form the edge at which the spark is most likely to arc. This makes it possible to achieve a uniform burn-off of the anode by sparking at the respectively most raised edge of the frontal area. Furthermore, an enlarged ignition frontal area is created by the irregularities formed according to the invention. A defined enlargement of the surface (compared to that of the prior art) can be achieved, in particular, by utilizing V-shaped notches. Such an arrangement results in a substantially improved spark breakdown on the edges of the notches over the operating time of the anode, and this minimizes the overall operational risk (risk of operation failure) of the igniter.

The invention also provides for an ignition anode comprising a body having an anode frontal area that includes a plurality of edges.

The ignition anode may be arranged on an ignition device of a reignitable rocket combustion chamber. Each of the plurality of edges may be a sharp-edge. Each of the plurality of edges may be at least one of: burr-free; has a width of about 0.1 mm or less; and has a width of about 0.02 mm or less. The plurality of edges may be defined by recesses arranged in the anode frontal area. The plurality of edges may be defined by projections arranged in the anode frontal area. The plurality of edges may be defined by V-shaped recesses. Each V-shaped recess may have a wall angle α of one of: between about 45° and about 75°; and between about 55° and about 65°. The plurality of edges may be defined by recesses arranged one of: substantially equally angularly spaced; uniformly distributed over the anode frontal area; in a star-shaped manner; oriented radially outwards from a center of the anode frontal area. The plurality of edges may be defined by recesses which are deeper in a radially outward area of the anode frontal area and shallower in a central area of the anode frontal area. The plurality of edges may be defined by recesses, and a bottom of each recess forms an angle β relative to the anode frontal area that is one of: between about 10° and about 20°; between about 12° and about 17°; and about 15°. The plurality of edges may be defined by radially oriented recesses and wherein an angle γ between two adjacent recesses is about 60°. The plurality of edges may be defined by radially oriented recesses defining six substantially triangular shaped sections. The plurality of edges may be defined by recesses having a bottom portion one of: having a width of about 0.1 mm or less; and having a width of about 0.05 mm or less. The body may comprise a generally cylindrical section, a constricted section, and an anode head section comprising the anode frontal area. The anode head section may be larger in diameter than the cylindrical section. The anode may further comprise a chamfer arranged at a periphery of the anode frontal area, thereby defining an annular edge. The ignition anode may be a solid body.

The invention also provides for an ignition device of a reignitable rocket combustion chamber, wherein the ignition anode comprises a body capable of being arranged in an ignition device and an anode frontal surface for generating ignition sparks and comprising a plurality of recesses which form edges at the anode frontal surface.

The invention also provides for an ignition device of a reignitable rocket combustion chamber, wherein the ignition anode comprises a one-piece body capable of being arranged in an ignition device and an anode frontal surface for generating ignition sparks and comprising a plurality of V-shaped recesses which form edges at the anode frontal surface.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 1:
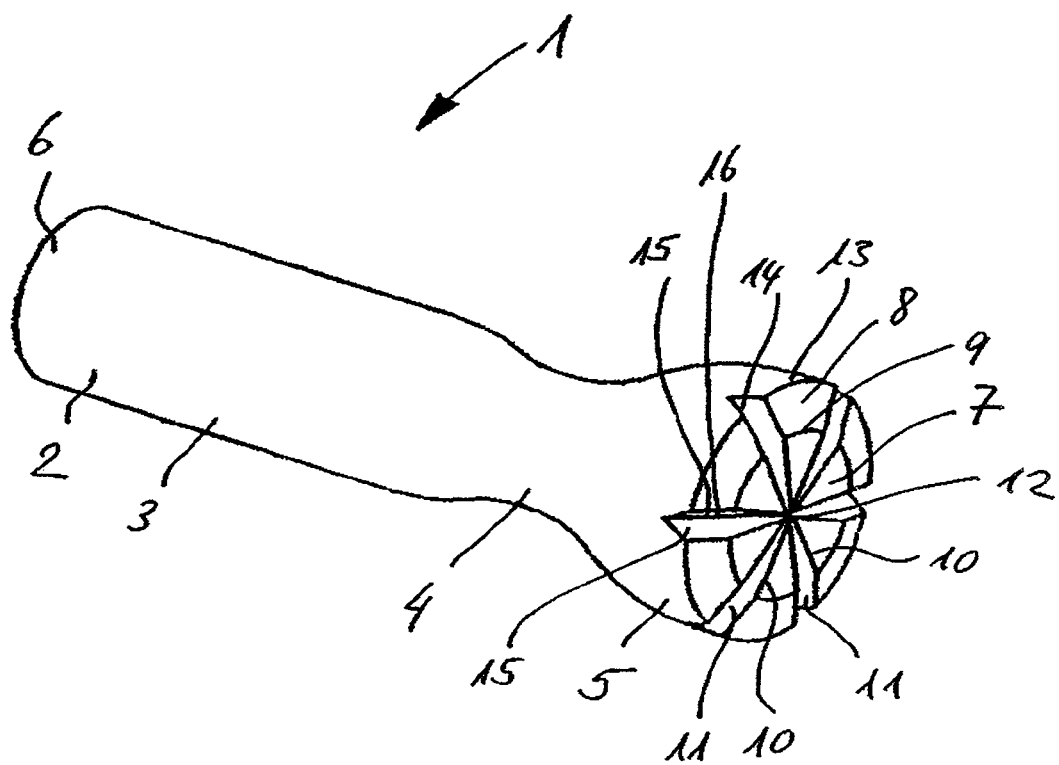
FIG. 1 shows a perspective view of an ignition anode according to the invention.
Figure 2:
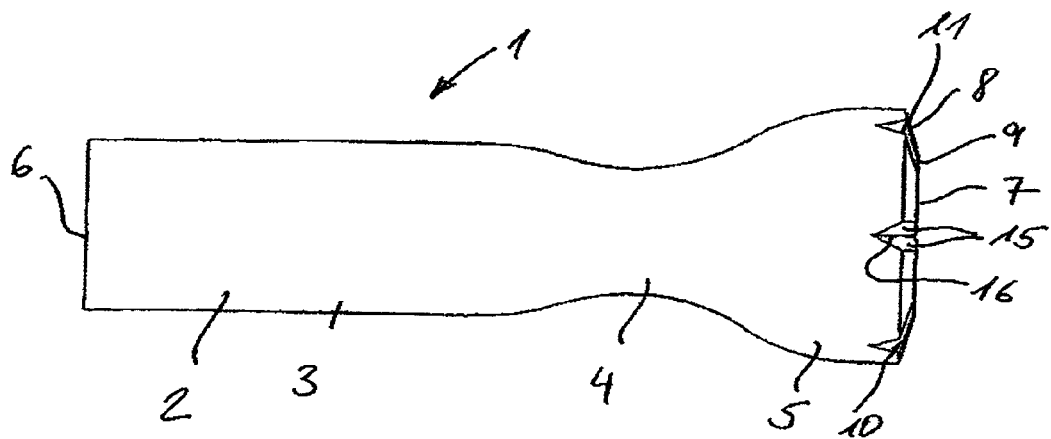
FIG. 2 shows a side view of the ignition anode shown in FIG. 1.
Figure 3:
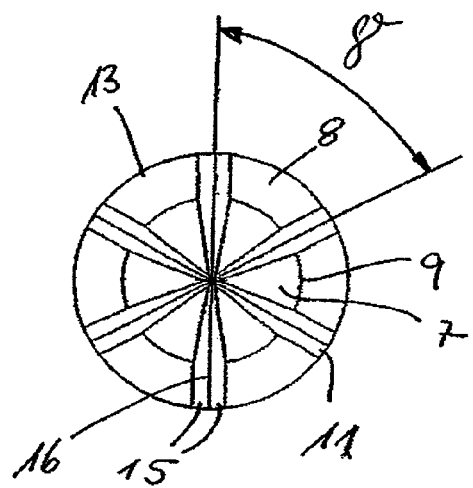
FIG. 3 shows a front side view of the ignition anode shown in FIG. 1.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIGS. 1-5 show a non-limiting embodiment of an ignition anode 1 which includes an ignition anode body 2 having a generally cylindrical section 3, a constricted section 4, and an anode head section 5. The anode head section 5 has a larger diameter than the cylindrical section 3. The cylindrical section 3 has a free end 6. The anode head section 5 has an anode frontal area 7 which is arranged opposite the free end 6. The anode frontal area 7 also has a flat or generally straight chamfer 8 surrounding a periphery of the frontal area 7 and forms an annular edge 9.

The anode frontal area 7 and the chamfer 8 include a plurality of edges 10 which are formed by a plurality of recesses 11. Although not shown, the plurality of edges 10 can also be formed by a plurality of projections or elevations which project beyond the anode frontal area 7. The recesses 11 and/or elevations (not shown) can be distributed in a regular (i.e., equally angularly spaced) manner and/or irregular (non-equally angularly spaced) manner over the anode frontal area 7.

Figure 4:
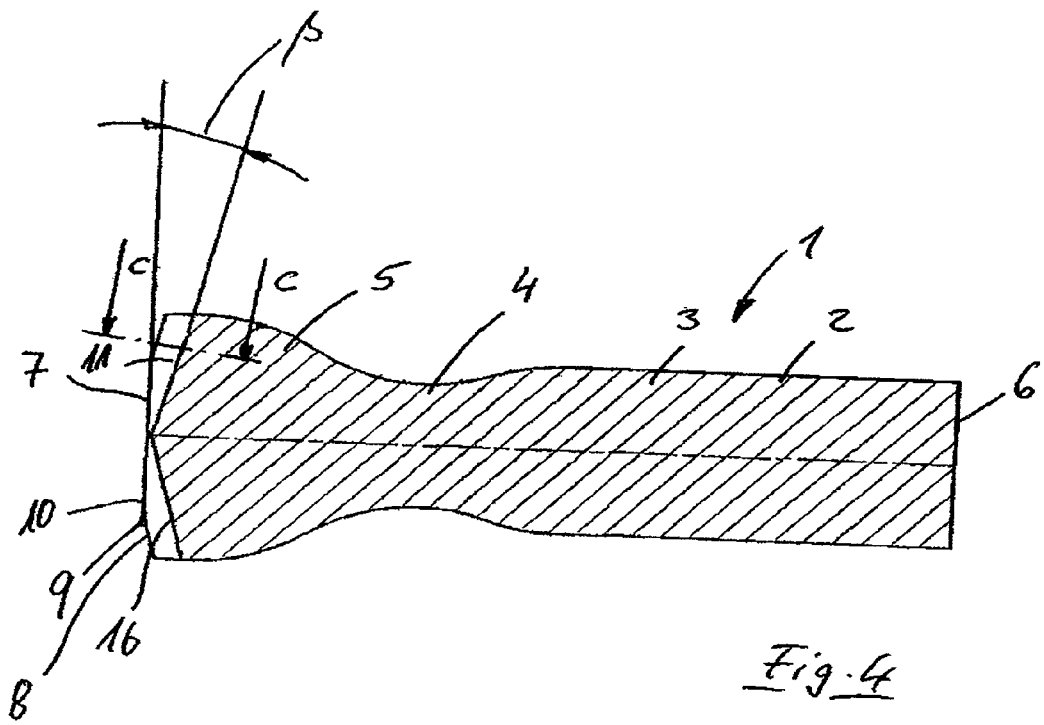
FIG. 4 shows a side cross-section view of the ignition anode shown in FIG. 1.
Figure 5:
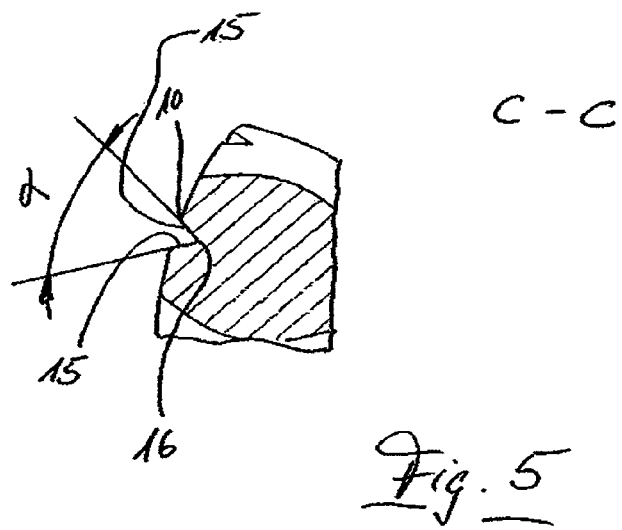
FIG. 5 shows a cross-section view along the line C-C from FIG. 4.
Figure 6:
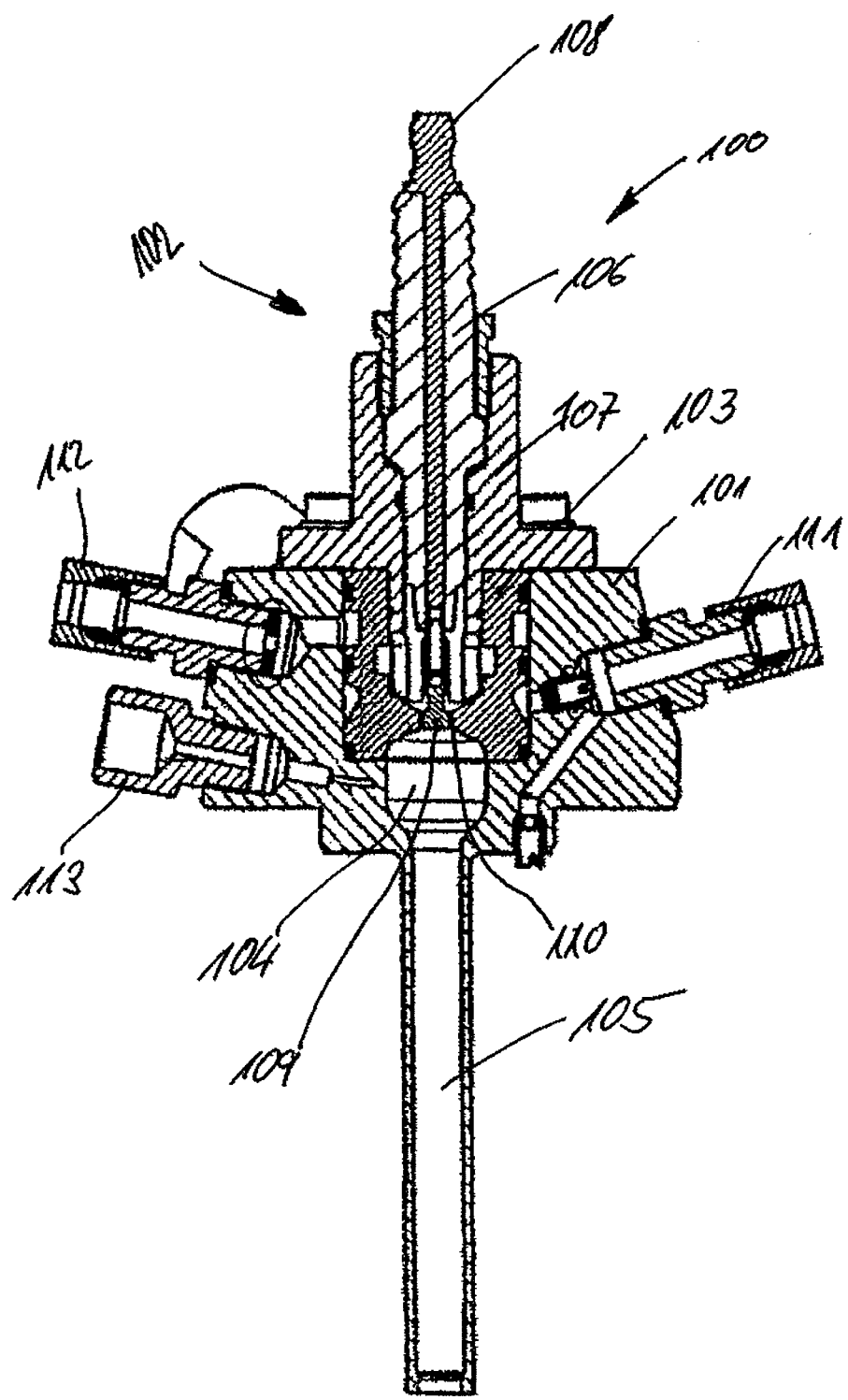
FIG. 6 shows a prior art igniter.
Figure 6A:
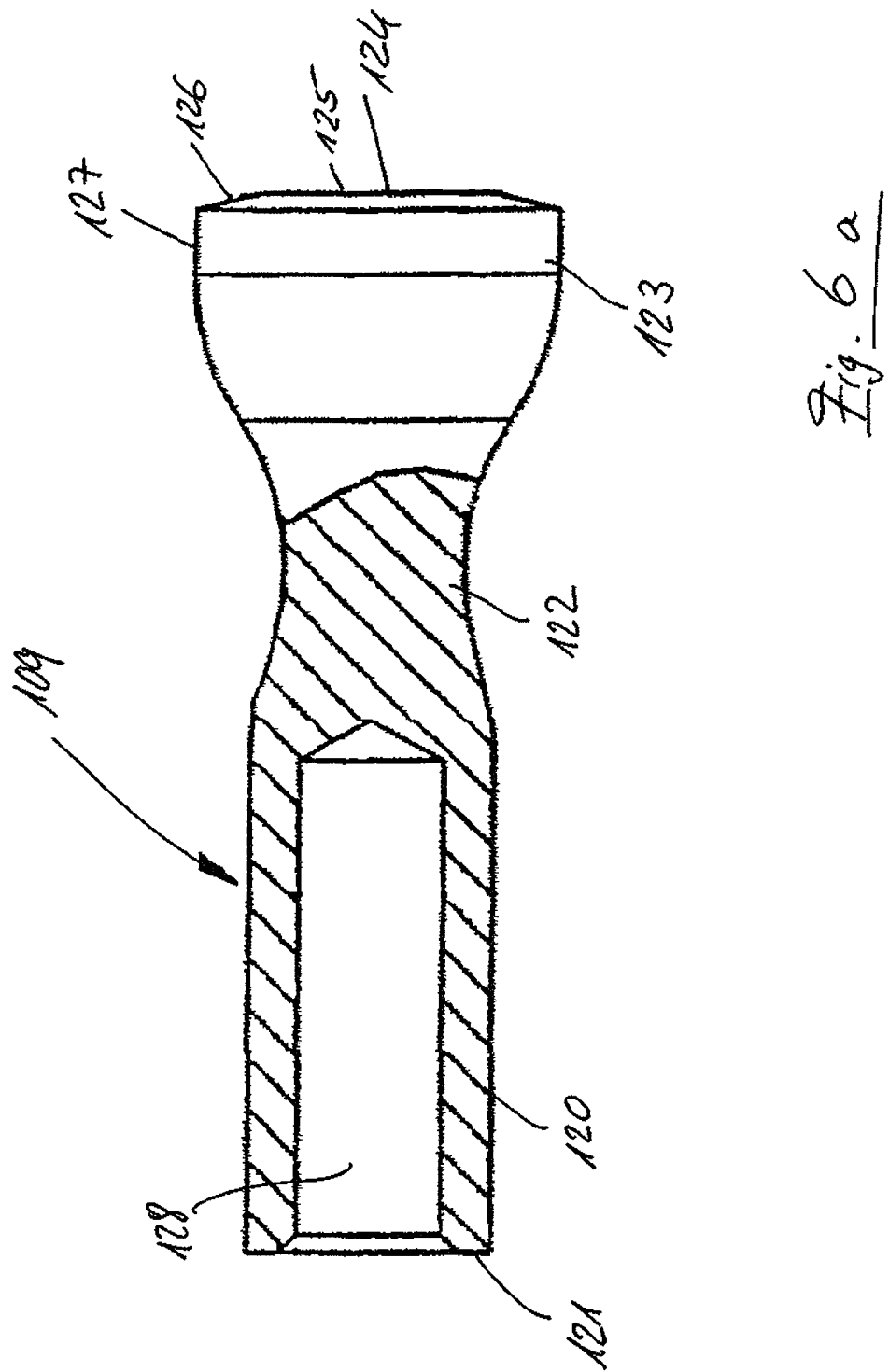
FIG. 6*a* shows a prior art igniter anode.

As illustrated in FIGS. 1-5, the recesses 11 can be V-shaped in cross-section and can extend radially outwards from a center 12 of the anode frontal area 7, so as to form V-shaped cut-outs 14 in a peripheral area 13 of the anode head section 5. By way of non-limiting example, the recesses 11 are distributed in a regularly radial manner over the surface of the ignition anode front side and can have an angle γ of about 60° between them. Each recess 11 has sloped limiting walls 15 which form the V-shaped cross-section of the recess 11 and can extend to an area of a recess bottom or base line 16. The recess bottom 16 runs in a sloping manner from the center 12 of the anode frontal area 7 towards the peripheral area 13 of the anode head section 5. By way of non-limiting example, the slope can be at an angle β that is between about 10° and about 20°, and can preferably be between about 12° to about 17°, and is most preferably about 15°. The angle β (see FIG. 4) can also be preferably chosen such that the base line 16 runs through the ignition anode 1 in a manner that is substantially parallel to the angle of the chamfer 8 (both angles being measured from a plane that is perpendicular to a center axis of the anode 1 as shown in FIG. 4). This ensures that the recesses 11 have a constant depth (i.e., the distance between the chamfer 9 and base 16) in an area between the annular edge 9 and the peripheral area 13.

In order to ensure the build-up or breakdown of a plasma spark, the edges 10, which are formed by the recesses 11, the anode frontal area 7 and the chamfers 8, are preferably defined by a sharp-edged, in particular, a sharp edge that is burr-free. Each edge 10 may have a width that is in the range of between about 0 mm and about 0.1 mm, and preferably has a width of between about 0 mm and about 0.02 mm. This latter range has proven itself to be a particularly preferred by ensuring that the edges have a burr-free quality.

Furthermore, it has proven to be advantageous for the base lines 16 of the recesses 11 to have a transition area or width that is between approx. 0 mm and approx. 0.1 mm, and preferably is between about 0 mm and about 0.5 mm. A wall angle α between the walls 15 of the V-shaped recesses 11 can be between about 45° and about 75° (and has proven useful), with this angle preferably being in the range of between about 55° and about 65°, and is most preferably about 60°. This results in edges 10 being formed by obtuse-angles, but which are considerably more acute-angled than the surrounding annular edge 9. The plasma spark breaks down surprisingly easily with edges 10 embodied in this manner and ensures a safe ignition or reignition of the rocket combustion chamber.

An increased ignition safety is advantageously achieved by utilizing a plurality of edges 10, which act as preferred breakdown locations for plasma sparks. Furthermore, a uniform wearing of the ignition anode 1 is ensured because a plurality of recesses 11 (notches) and edges 10 resulting therefrom are utilized. This is because the erosion which occurs via plasma sparks is more evenly distributed over the ignition anode frontal area 7 and the chamfer 8.

As explained above, it is particularly preferred that the anode 1 include a plurality of edges 10 with e.g., the edges 10 being formed by recesses 11. However, it is also possible to create the edges 10 using elevations or projections (not shown) which extend from the anode frontal surfaces 7, 9. These elevations can also distributed in a uniform or non-uniform manner. Again, the recesses 11 (as well as the elevations) can preferably be distributed over the anode frontal surface 7, 8 in either a uniform or non-uniform manner. In addition to the regularly star-shaped arrangement pattern of the recesses 11 shown in FIGS. 1-5, this area can optionally utilize a latticed or otherwise grid-shaped arrangement, e.g., with square, rectangular or rhombic grid patterns, also being possible. This naturally also applies to any elevations which are utilized instead of recesses.

According to another non-limiting example, the anode frontal area 7, 8 can be irregularly formed from elevations and recesses 11 such that, for example, in that the anode frontal area 7 constitutes a fracture area (not shown). To produce a fracture area of this type, for example, one can first produce a symmetrical body comprising two cylindrical sections 3, two constricted sections 4 and two anode head sections 5, which are connected to one another in the area of the anode head frontal area 7. Subsequently, the chamfer 8 could be created by forming a groove between the opposing bodies, and then the two bodies could be forcibly broken apart at a notch formed between the bodies. An irregular break contour can thus be formed in the area of the ignition anode frontal area 7 of two bodies. This break contour can be characterized by sharp-edged elevations and recesses, which provides a plurality of edges in order to guarantee a safe ignition or build-up of the plasma spark.

The invention also advantageously provides a more uniform anode burn-off which occurs through a guidance of the high-voltage spark along the edges 10, and, in particular, along the notch edges. The safety and/or reliability of reignition is increased, so that a lower operational risk is realized compared to the prior art. A symmetrical burn-off of the anode 1 can also be ensured when the spark guidance on the edges 10 is provided using a symmetrical arrangement of the edges 10 over a surface of the anode frontal area 7. Furthermore, the anode frontal area is provided with a greater surface area (compared to the prior art) through the use of notches and edges 10.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

| | |
|---|---|
| 1 | Ignition anode |
| 2 | Ignition anode body |
| 3 | Cylindrical section |
| 4 | Constricted section |
| 5 | Anode head section |
| 6 | Free end |
| 7 | Anode frontal area |
| 8 | Flat chamfer |
| 9 | Annular edge |
| 10 | Edges |
| 11 | Recesses |
| 12 | Center |
| 13 | Peripheral area |
| 14 | V-shaped cut-outs |
| 15 | Limiting walls |
| 16 | Recess base line |
| 100 | Igniter |
| 101 | Igniter housing |
| 102 | Spark plug device or spark plug equipment |
| 103 | Igniter injection head |
| 104 | Ignition combustion chamber |
| 105 | Ignition flame tube |
| 106 | Spark plug |
| 107 | Spark plug clamping ring |
| 108 | Connection end |
| 109 | Ignition anode |
| 110 | Annular clearance |
| 111 | Pipe connection for hydrogen supply |
| 112 | Pipe connection for oxygen supply |
| 113 | Measuring devices |
| 120 | Cylindrical structure |
| 121 | Free end |
| 122 | Constricted section |
| 123 | Anode head section |
| 124 | Free end |
| 125 | Flat frontal area or anode frontal area |
| 126 | Flat-angled chamfer |
| 126a | Annular edge |
| 127 | Outside |
| 128 | Blind-hole recess |

What is claimed:

1. An ignition anode for a rocket combustion chamber comprising:
   a body having a chamfer and an anode frontal area that includes a plurality of surfaces forming at least one of v-shaped recesses or nodes having apex lines obliquely extending outwardly from a central area of the anode frontal area.

2. The ignition anode of claim 1, wherein the ignition anode is structured to be positionable on an ignition device of a reignitable rocket combustion chamber.

3. The ignition anode of claim 1, wherein each of the at least one of v-shaped recesses or nodes is at least one of: burr-free; has a width of about 0.1 mm or less; and has a width of about 0.02 mm or less.

4. The ignition anode of claim 1, wherein the at least one of v-shaped recesses or nodes are defined by radially oriented recesses formed in the anode frontal area.

5. The ignition anode of claim 1, wherein the at least one of v-shaped recesses or nodes are defined by radially oriented nodes formed in the anode frontal area.

6. The ignition anode of claim 1, wherein the at least one of v-shaped recesses or nodes are defined by recesses and the apex lines form respective bottom portions having one of: a width of about 0.1 mm or less; and a width of about 0.05 mm or less.

7. The ignition anode of claim 1, wherein the at least one of v-shaped recesses or nodes are arranged one of:
   substantially equally angularly spaced;
   uniformly distributed over the anode frontal area;
   in a star-shaped manner;
   oriented radially outwards from a center of the anode frontal area.

8. The ignition anode of claim 1, wherein the V-shaped recess are deeper in a radially outward area of the anode frontal area and shallower in the central area of the anode frontal area.

9. The ignition anode of claim 1, wherein the apex lines of the v-shaped recesses define a bottom of each recess that forms an angle $\delta$ relative to the anode frontal area that is one of: between about 10° and about 20°; between about 12° and about 17°; and about 15°.

10. The ignition anode of claim 1, wherein the at least one of v-shaped recesses or nodes are defined by radially oriented recesses and wherein an angle $\gamma$ between two adjacent recesses is about 60°.

11. The ignition anode of claim 1, wherein the at least one of v-shaped recesses or nodes are defined by radially oriented recesses or nodes defining six substantially triangular shaped sections.

12. An ignition anode for a reignitable rocket combustion chamber comprising:
    an anode frontal area;
    a chamfer arranged to surround the anode frontal area, whereby an annular edge is formed between the anode frontal area and the chamfer; and
    a plurality of edges at least one of v-shaped recesses or nodes extending from the anode frontal area through the annular edge and through the chamfer such that a depth of the recesses or a height of the nodes increases radially outwardly, wherein the ignition anode is positionable on an ignition device of a reignitable rocket combustion chamber.

13. The ignition anode of claim 1, wherein the body comprises a generally cylindrical section, a constricted section, and an anode head section comprising the anode frontal area.

14. The ignition anode of claim 1, wherein the chamfer is arranged at a periphery of the anode frontal area, thereby defining an annular edge.

15. The ignition anode of claim 1, wherein the ignition anode is a solid body.

16. The ignition anode of claim 1, wherein each V-shaped recess has a wall angle $\alpha$ of one of: between about 45° and about 75°; and between about 55° and about 65°.

17. The ignition anode of claim 13, wherein the anode head section is larger in diameter than the cylindrical section.

18. An ignition anode for an ignition device of a reignitable rocket combustion chamber, the ignition anode comprising:
    a one-piece body capable of being arranged in an ignition device; and
    an anode frontal surface for generating ignition sparks; and
    a chamfer surrounding the anode frontal surface,
    the anode frontal surface comprising a plurality of V-shaped recesses which form edges at in the anode frontal surface,
    wherein a depth of the V-shaped recesses increase from a central portion of the anode frontal surface radially outward.

19. An ignition anode for an ignition device of a reignitable rocket combustion chamber, the ignition anode comprising:
    a body capable of being arranged in an ignition device; and
    an anode frontal surface; and
    a chamfer surrounding the anode frontal surface,
    the anode frontal surface being structured for generating ignition sparks and comprising a plurality of v-shaped recesses which form edges that extend at least from the anode frontal surface through the chamfer,
    wherein base lines of the plurality of v-shaped recesses extend from a common point on the anode frontal surface and are oriented obliquely to the anode frontal surface.

\* \* \* \* \*